(12) United States Patent
Hunzinger

(10) Patent No.: US 6,937,578 B1
(45) Date of Patent: Aug. 30, 2005

(54) FAST-SLEEP CONFIGURATION FOR CDMA SLOTTED MODE

(75) Inventor: Jason F. Hunzinger, Carlsbad, CA (US)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 09/497,076

(22) Filed: Feb. 2, 2000

(51) Int. Cl.[7] ............................................. G08C 17/00
(52) U.S. Cl. ....................................... 370/311; 455/574
(58) Field of Search ................................ 370/311, 335, 370/318, 328, 342, 332, 441; 455/574, 13.4, 522, 422; 340/7.32, 7.34, 7.36, 7.38

(56) References Cited

U.S. PATENT DOCUMENTS

| | | | | |
|---|---|---|---|---|
| 5,392,287 A | * | 2/1995 | Tiedemann et al. | 370/311 |
| 5,845,204 A | * | 12/1998 | Chapman et al. | 455/343.1 |
| 6,016,312 A | * | 1/2000 | Storm et al. | 370/311 |
| 6,072,784 A | * | 6/2000 | Agrawal et al. | 370/311 |
| 6,088,602 A | * | 7/2000 | Banister | 455/574 |
| 6,282,181 B1 | * | 8/2001 | Stark et al. | 370/335 |
| 6,289,227 B1 | * | 9/2001 | Shi | 455/574 |
| 6,453,181 B1 | * | 9/2002 | Challa et al. | 455/574 |
| 6,459,376 B2 | * | 10/2002 | Trosper | 340/571 |
| 6,526,295 B1 | * | 2/2003 | Shull | 455/574 |
| 6,600,428 B1 | * | 7/2003 | O'Toole et al. | 340/825.36 |
| 2002/0118653 A1 | * | 8/2002 | Lomp et al. | |

* cited by examiner

*Primary Examiner*—Ajit Patel
(74) *Attorney, Agent, or Firm*—Harness, Dickey & Pierce, PLC

(57) ABSTRACT

A sleep timing system for a wireless mobile station includes a circuitry that enables the mobile station to enter a low-power mode immediately upon command. The circuitry transitions the mobile station into the low-power mode without waiting for a next pseudo-random noise (PN) sequence roll boundary. The timing system includes a counter, a wakeup time register, and a sleep timer. The counter receives a PN sequence and estimates a number of clock cycles to the next PN sequence roll boundary. The wakeup time register may be set with a sleep time value in terms of number of PN roll boundaries. The register is provided with a new sleep time value that includes the number of clock cycles to the next PN sequence roll boundary.

26 Claims, 5 Drawing Sheets

US 6,937,578 B1

FAST-SLEEP CONFIGURATION FOR CDMA SLOTTED MODE

BACKGROUND

The present disclosure relates to increasing standby time in Code Division Multiple Access (CDMA) mobile stations.

The CDMA paging channel transmitted by the base station is divided into slots. A mobile station operating in the "slotted" mode only needs to monitor its own slot for messages. It may "sleep" at other times in order to increase standby time. When the mobile station is not engaged in a call, i.e. it is in an idle period, the mobile does not continuously monitor the paging channel but often remains in a low-power state. The mobile station shuts off all non-essential circuitry during idle periods between paging channel slot cycles. These low-power idle periods conserve power and prolong battery life. However, the mobile station needs to maintain system time during sleep intervals to determine when to wake up and listen to the paging channel again.

Prior to entry into the low-power sleep mode, the CDMA mobile station calculates in advance the timing required to wake up selected portions of the mobile station circuitry. The mobile station enters the low-power sleep mode for a time duration that is based on sleep timer periods, which is synchronized to the system time. In the sleep mode, the mobile uses a sleep timer to estimate the system time. The sleep timer is synchronized to the received pseudo-random noise (PN) sequence roll boundaries and to a roll count. The roll boundary occurs every 26⅔ mS. When the sleep timer matches the stored wakeup time, the mobile reactivates the selected portions of the mobile station circuitry to exit the sleep mode and reacquire communication with the system. Since synchronization is performed at the PN roll boundaries, the above configuration requires the mobile station to wait for one or more roll boundaries to occur before entering the sleep mode.

SUMMARY

In recognition of the above, the inventor has developed a timing system for a wireless mobile station. The system includes a circuit or method that enables the mobile station to enter a low-power mode immediately upon command. The system operates to transition the mobile station into the low-power mode without waiting for a next pseudo-random noise (PN) sequence roll boundary.

In one aspect, the timing system includes a counter, a wakeup time register, and a sleep timer. The counter receives a PN sequence and estimates a number of clock cycles to the next slot. The wakeup time register receives a sleep time value in terms of a number of PN roll boundaries. The register then provides a new sleep time value that includes the number of clock cycles to the next PN sequence roll boundary. In one embodiment, the sleep timer is configured to issue a sleep command at the beginning of the low-power mode, and to keep internal time during the low-power mode. The sleep timer also provides a wakeup signal when the internal time reaches the new sleep time value.

In another aspect, a method for managing sleep timing operations in a wireless mobile device is disclosed. The method involves storing a calculated wakeup time including time to next PN sequence roll boundary, upon command to enter a low-power mode. The device is transitioned into the low-power mode without waiting for the roll boundary. A further aspect includes a method for managing sleep timing operations in a CDMA slotted-paging mode. The method comprises monitoring allotted slots or interrupts, waking up at appropriate time to service the slots or interrupts, and immediately entering a low power mode when commanded. The timing operations are properly performed before entering the low-power mode.

In an alternative aspect, a local time reference is artificially advanced so that the next PN roll boundary occurs substantially immediately. The local PN roll boundary is advanced by slewing the local time reference and providing appropriate wakeup time to the mobile station.

In another aspect, a wireless telephone device is disclosed. The device includes a housing, and a sleep timing system within the housing. The sleep timing system enables the device to enter a low-power mode immediately upon command to enter the mode. The system operates to transition the device into the low-power mode without waiting for a next PN sequence roll boundary.

BRIEF DESCRIPTION OF THE DRAWINGS

Different aspects of the disclosure will be described in reference to the accompanying drawings wherein.

DETAILED DESCRIPTION

The inventor recognized that by removing the dependency of the slotted mode sleep timer to the system time, the mobile could go to sleep earlier and sleep longer. This, in turn, can increase battery life.

Figure 1:
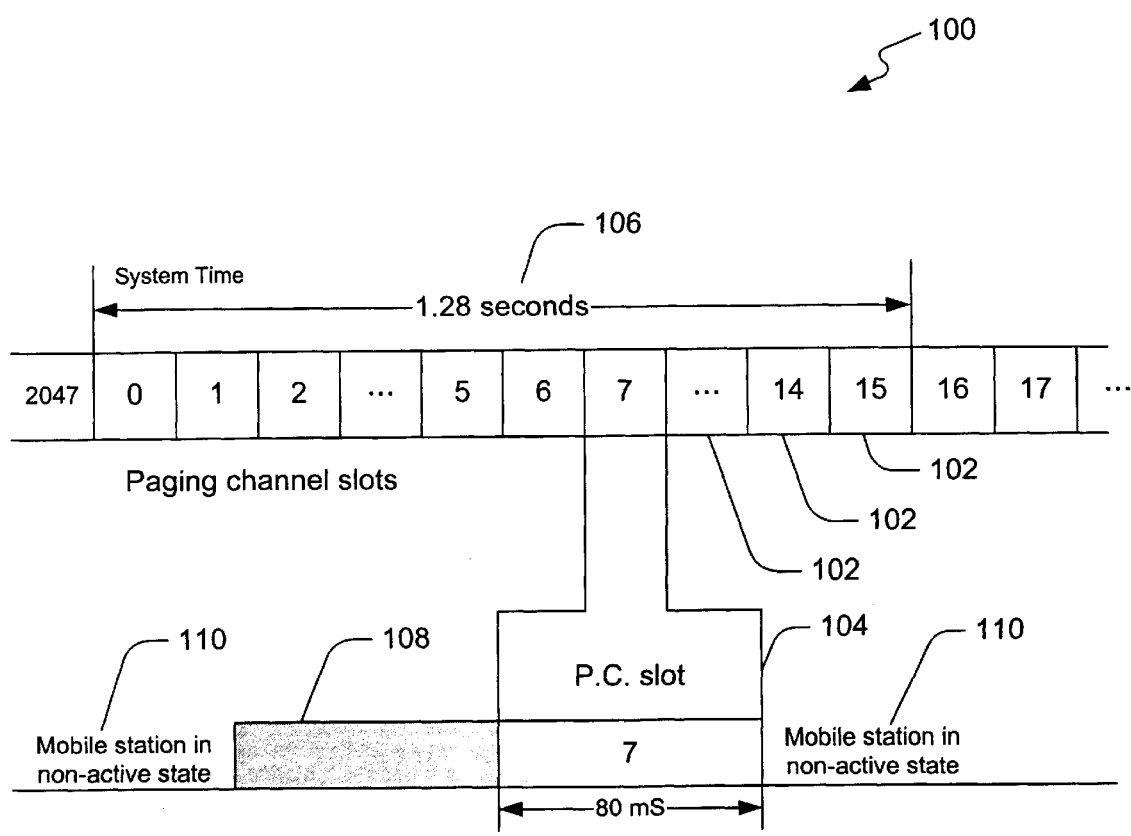
FIG. 1 shows a mobile station slotted mode structure.

FIG. 1 shows a typical mobile station slotted mode structure 100. The structure 100 illustrates a paging channel divided into 80 mS slots referred to as paging channel slots 102, 104.

A mobile station that monitors the paging channel only during certain assigned slots 104 is referred to as operating in the slotted mode. In the slots 102 during which the paging channel is not being monitored, the mobile station can stop or reduce its processing for power conservation. A mobile station operating in the slotted mode generally monitors the paging channel for one or two slots per slot cycle.

In an embodiment shown in FIG. 1, the paging channel slot 7 is first monitored. The minimum length of the slot cycle 106 has of 16 slots of 80 mS each, which equals 1.28 seconds. Thus, within this 1.28-second slot cycle period 106, only slot 7 (80 mS) is monitored. The next slot in which the mobile station needs to wake up to monitor the paging channel is 16 slots later, at slot 23.

For each of its assigned slots 104, the mobile station initiates the monitoring of the paging channel in time to decode the first bit of the assigned slot 104. Reacquisition of an RF link in the system begins at a specified time 108 before the beginning of the assigned slot (slot 7).

The mobile station in a CDMA system is synchronized with system time, i.e. the timing maintained by base stations and a network controller in the CDMA system. Timing for the forward link (base station to mobile station) is maintained by the mobile station with the expectation that, when an assigned slot occurs, the mobile can wake up quickly, make corrections for timing uncertainties and be ready to acquire and process the paging channel. Once the slot period ends, the mobile station can return to non-active state 110.

Synchronization with the forward link includes alignment of a locally-generated pseudo-random noise (PN) sequence with a PN sequence transmitted by a base station on a pilot channel. The transmitted sequence repeats every 26⅔ mS. Once the pilot channel has been acquired, the mobile attempts to acquire a synchronization channel and a paging channel. The mobile can then correctly demodulate traffic channels and establish a full duplex link with the base station.

Figure 2:
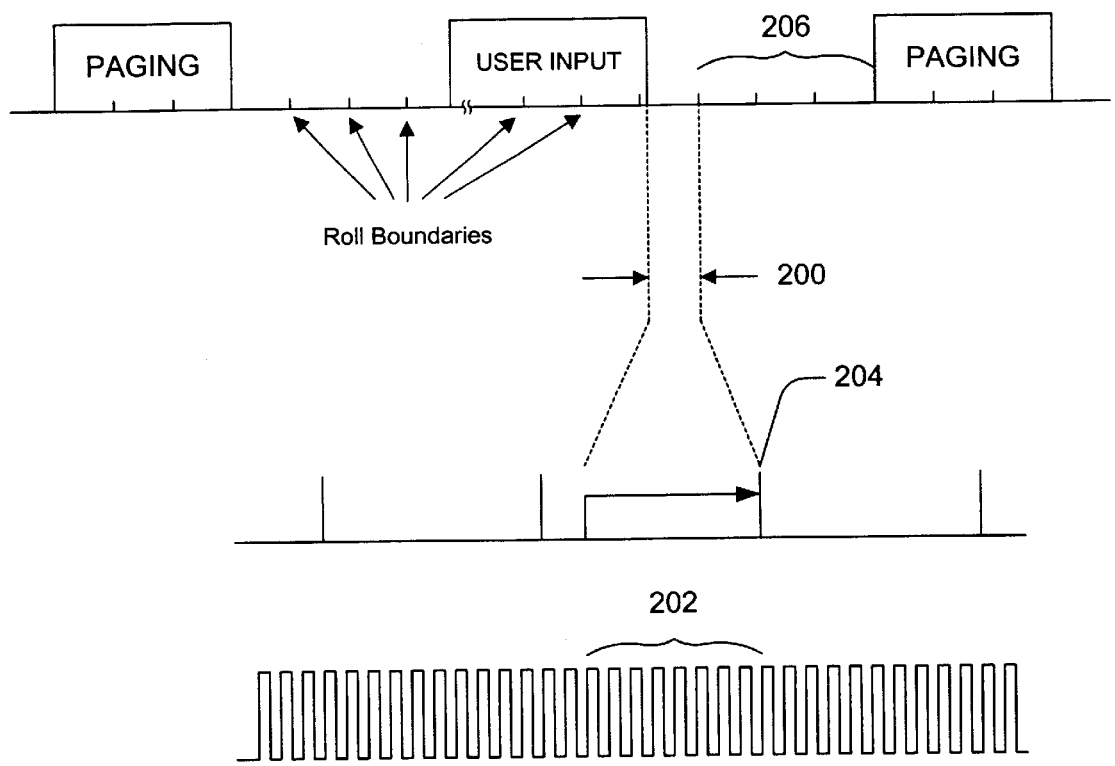
FIG. 2 shows a timing process for sleep operations according to an embodiment of the present disclosure.

FIG. 2 shows a timing process for sleep operations according to one embodiment. According to an illustrated embodiment, the mobile station estimates the upcoming PN roll boundary 200 in advance, instead of waiting for the occurrence of a PN roll boundary. The mobile station counts its internal clock that is updated and corrected on an ongoing basis through comparison with system time. The system time maintains its accuracy by synchronizing itself with the PN roll boundaries. The mobile can go to sleep immediately by adding the counted time interval 202 to the next PN roll boundary 204 to the normal sleep time 206. Thus, the timing process of the present disclosure allows additional sleep time whenever it is commanded into a low-power mode.

Figure 3:
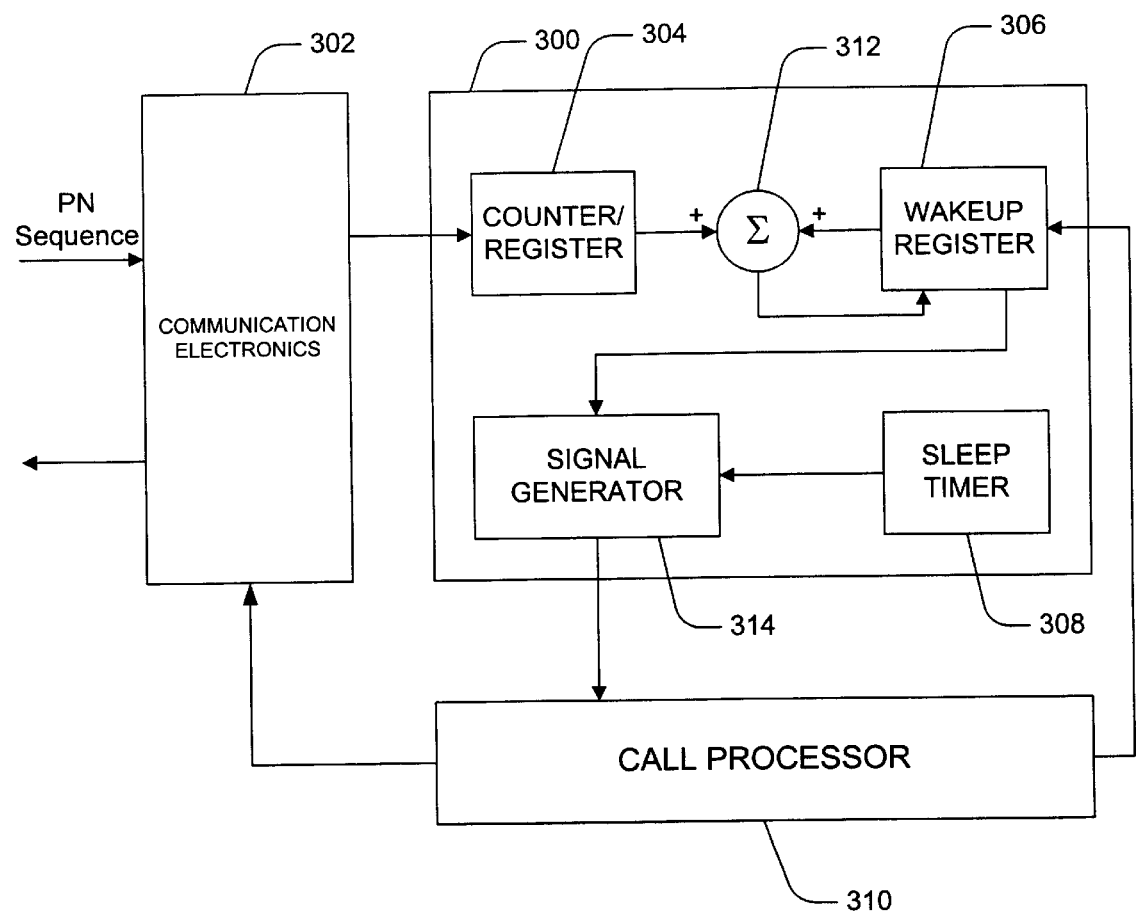
FIG. 3 is a block diagram of a timing system according to an embodiment of the present disclosure.

FIG. 3 is a block diagram of a timing system 300 that enables a mobile station to enter the low-power mode immediately upon command. Communication electronics 302 receive the PN sequence on a pilot channel and sends the sequence to the timing system 300.

The timing system 300 counts the number of clock cycles to the next PN roll boundary and stores the count in a register 304. The content of this register 304 is subsequently summed by a summing element 312 with a wakeup-time register 306 that contains the sleep time in terms of number of roll boundaries. A signal generator 314 in the timing system 300 then sends a signal to a call processor 310 indicating that the mobile can be transitioned into the low-power mode again. When the value in the wakeup-time register 306 equals the sleep timer 308, the signal generator 314 generates a signal to the call processor 310 to wakeup the mobile station.

Figure 4:
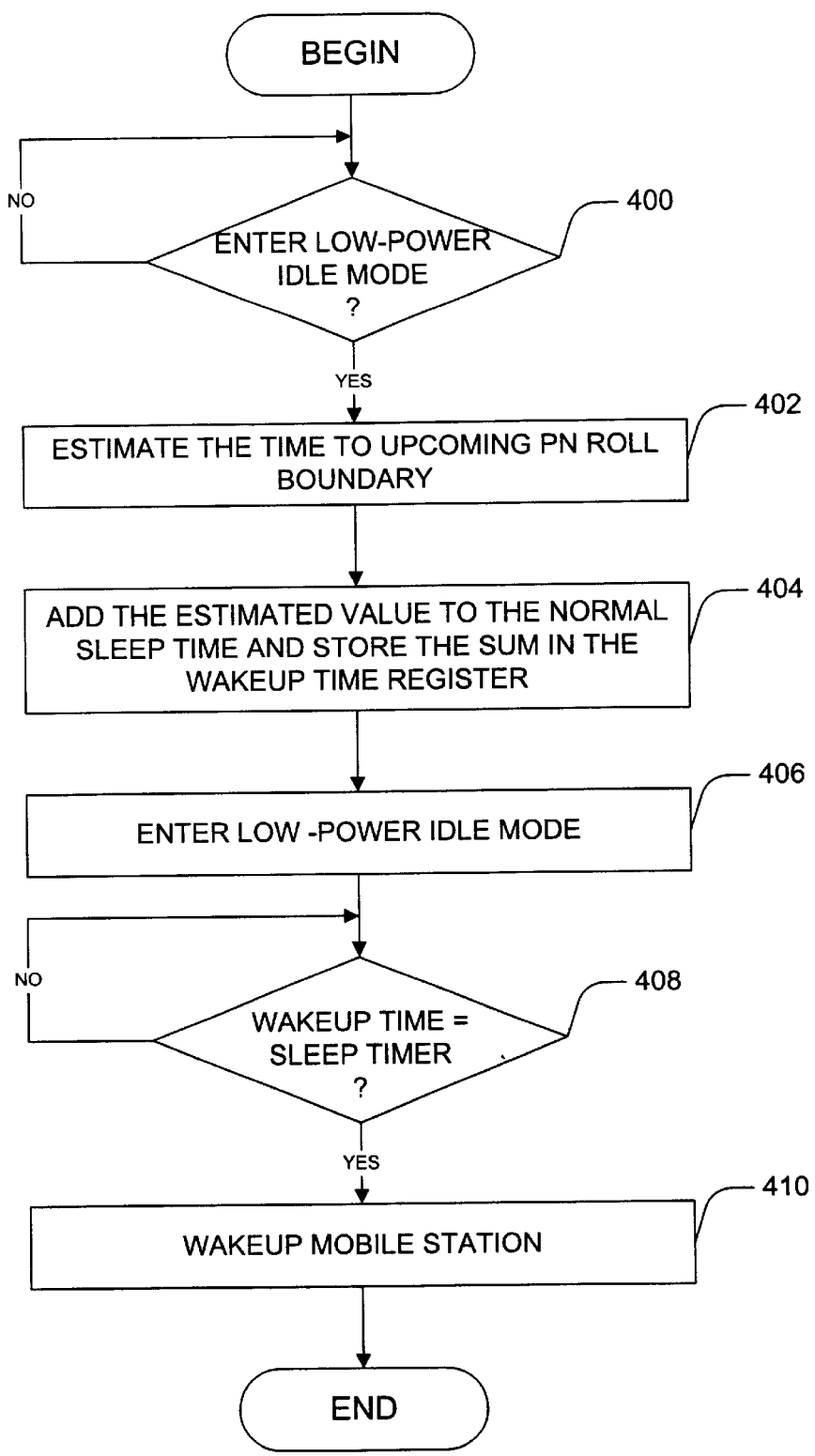
FIG. 4 is a flowchart of the timing process illustrated in FIG. 2.

FIG. 4 is a flowchart of the timing process according to one embodiment of the present disclosure. The process begins, at step 400, with a query of a command to enter the low-power mode. If the command has been issued, the timing system estimates the time to the upcoming PN roll boundary (step 402). At step 404, the estimated value is added to the normal sleep time in the wakeup-time register. Once the wakeup time is established, the mobile station enters the low-power mode at step 406.

If the sleep timer equals the value in the wakeup-time register (step 408), the mobile station wakes up from the low-power mode, at step 410.

In an alternative aspect, the call processor 310 can advance its local time reference artificially so that the next PN roll boundary occurs substantially immediately. For example, the call processor 310 can adjust its local PN roll boundary by slewing the local time reference and providing appropriate wakeup time to the wakeup register 306. The local PN roll boundary is artificially adjusted to allow the mobile station to immediately enter the low-power mode.

Figure 5:
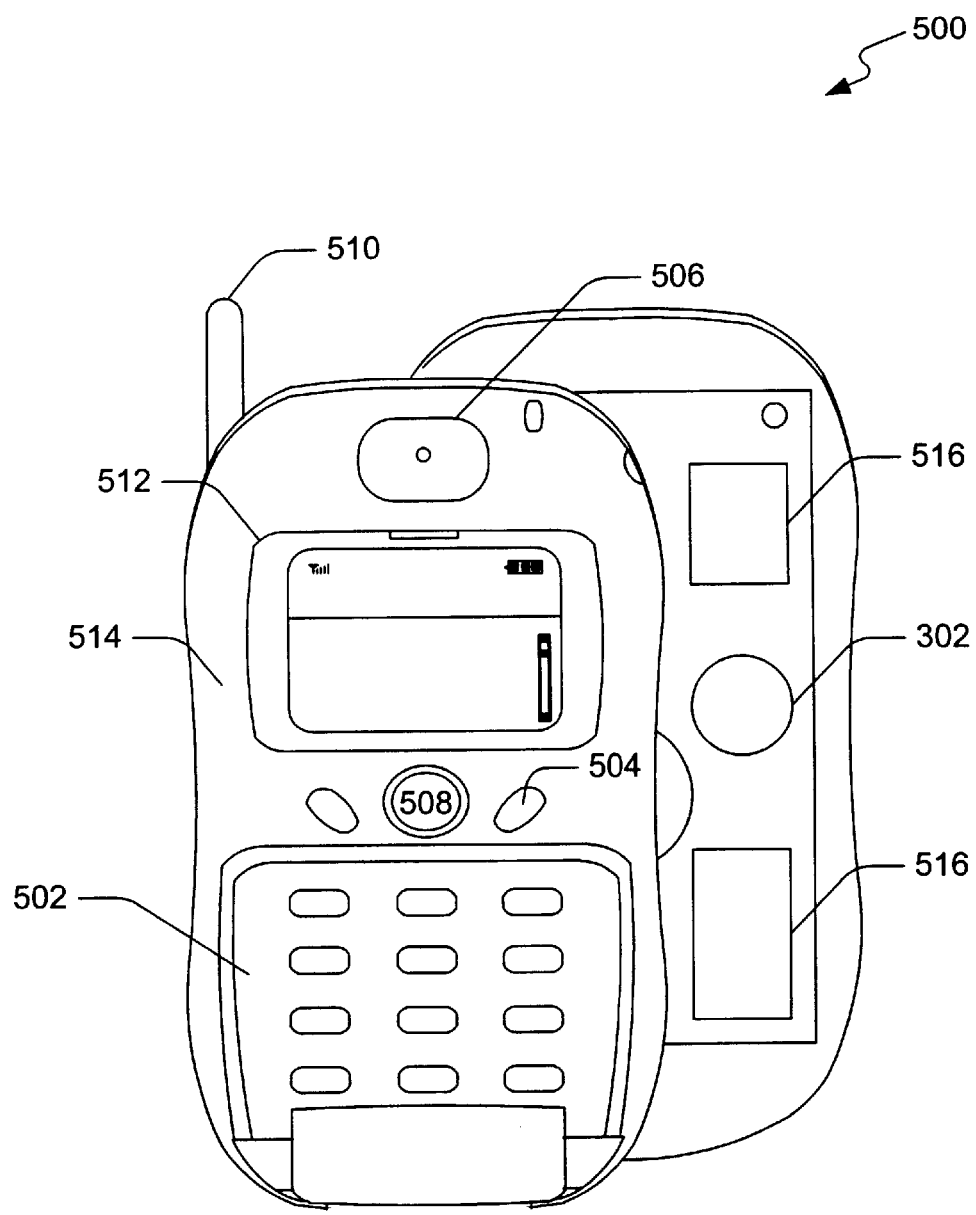
FIG. 5 shows a wireless device according to one embodiment of the present disclosure.

FIG. 5 shows a front exploded view of a wireless device, such as a cellular telephone, according to one embodiment of the present disclosure. The phone 500 uses the timing system 302 described above for providing timing for sleep operations. The cellular telephone 500 also includes a keypad 502 and various other buttons and indicators 504. The telephone 500 also includes a speaker 506, a microphone 508, an antenna 510, and other communication electronics 516 contained within a telephone housing 514. A display unit 512 is used in conjunction with the keypad 502 to facilitate user inputs.

In another aspect, a computer program on a computer-readable storage medium having executable instructions for enabling a mobile station to enter a low-power mode substantially immediately upon command is disclosed. The program interacts with the call processor 310 to enable the processor 310 to slew a local time reference so that a next timing roll boundary occurs immediately. The program also stores a calculated wakeup time including time to a next roll boundary, upon command to enter a low-power mode. The program then transitions the mobile station into the low-power mode without waiting for the roll boundary.

Other embodiments and variations are possible. For example, a countdown mechanism may be used in place of the register and counter. Further, the sleep duration can be specified in terms of local PN cycles instead of multiple of PN roll boundaries.

All these are intended to be encompassed by the following claims.

What is claimed is:

1. A timing system for a wireless mobile station, the system comprising:
   a communication element operating to communicate with a remote station; and
   a circuit that enables the mobile station to enter a low-power mode after a next timing boundary when a command is received;
   wherein the circuit artificially slews local system time upon receipt of said command so that the next timing boundary occurs substantially immediately.

2. The system of claim 1, wherein said timing boundary is a pseudo-random noise sequence roll boundary, and said circuit includes a counter to receive a pseudo-random noise sequence, said counter estimating a number of clock cycles to a next pseudo-random noise sequence roll boundary.

3. The system of claim 2, wherein said circuit further includes a wakeup time register to receive a sleep time value in terms of a number of pseudo-random noise roll boundaries, said wakeup time register providing a new sleep time value that includes said number of clock cycles to said next pseudo-random noise sequence roll boundary.

4. The system of claim 3, wherein said wakeup time register includes a summing element that sums said received sleep time value with said number of clock cycles to said next pseudo random noise sequence roll boundary.

5. The system of claim 3, wherein said circuit further includes a sleep timer configured to issue a sleep command at the beginning of said low-power mode, and to keep internal time during said low-power mode, said sleep timer providing a wakeup signal when said internal time reaches said new sleep time value.

6. The system of claim 5, wherein said sleep timer includes a signal generator operating to generate said wakeup signal based on said internal time and said new sleep time value.

7. A method for managing sleep timing operations in a CDMA slotted-paging mode, comprising:
   monitoring allotted slots or interrupts;
   waking up at an appropriate time to service said slots or interrupts;
   immediately entering a low-power mode when commanded;
   slewing local system time before entering said low-power mode:
   determining a difference between said slewed local system time and correct system time that corresponds to said allotted slots; and
   incorporating said difference into the duration of said low-power mode.

8. The method of claim 7, wherein said timing operations include:

storing a calculated wakeup time including time to next pseudo-random noise sequence roll boundary, upon command to enter a low-power mode; and transitioning into said low-power mode without waiting for said roll boundary.

9. The method of claim 8, further comprising:

receiving a wakeup time based only on a number of pseudo-random nose sequence roll boundaries;

estimating said time to next pseudo-random noise sequence roll boundary; and providing said calculated wakeup time based on said time to next pseudo-random noise sequence roll boundary and said wakeup time based only on said number of pseudo-random noise roll boundaries.

10. The method of claim 8, further comprising:

providing an internal sleep time; and transitioning out of said low-power mode when said sleep time reaches said calculated wakeup time.

11. A method for managing sleep timing operations in a wireless mobile device, comprising:

slewing a local time reference so that an artificial timing roll boundary occurs immediately upon a command to enter a low-power mode, wherein said artificial timing roll boundary occurs sooner than a next timing roll boundary;

storing a calculated wakeup time based in part on a time period to said next timing roll boundary, upon the command to enter said low-power mode; and transitioning into said low-power mode in accordance with said local time reference without waiting for said next timing roll boundary.

12. A computer program on a computer-readable storage medium having executable instructions that enable a mobile station to enter a low-power mode substantially immediately upon command, said program enabling the computer to:

slew a local time reference so that an artificial timing roll boundary occurs immediately upon a command to enter a low-power mode, wherein said artificial timing roll boundary occurs sooner than a next timing roll boundary;

store a calculated wakeup time based in part on a time period to said next timing roll boundary, upon the command to enter said low-power mode; and transition into said low-power mode in accordance with said local time reference without waiting for said next timing roll boundary.

13. A wireless telephone device, comprising:

a housing; and a sleep timing system within the housing, said system enabling the device to enter a low-power mode after a next roll boundary when a command is received;

wherein the sleep timing system artificially slews local system time upon receipt of said command so that the next roll boundary occurs substantially immediately.

14. The device of claim 13, wherein said roll boundary is a pseudo-random noise sequence roll boundary.

15. The device of claim 14, wherein said sleep timing system includes:

a counter to receive a pseudo-random noise sequence, said counter estimating a number of clock cycles to said next pseudo-random noise sequence roll boundary;

a wakeup time register to receive a sleep time value in terms of number of pseudo-random noise roll boundaries, said wakeup time register providing a new sleep time value that includes said number of clock cycles to said next pseudo-random noise sequence roll boundary; and a sleep timer configured to issue a sleep command at the beginning of said low-power mode, and to keep internal time during said low-power mode, said sleep timer providing a wakeup signal when said internal time reaches said new sleep time value.

16. A method for managing sleep timing operations in a wireless mobile device, comprising:

computing a time difference between a first system time that corresponds to a desired start time of sleep and a second system time that corresponds to a system time event;

slewing a local reference clock from a first time that is synchronized with system timing to a second time that is offset from the system timing by the time difference; and entering sleep when the local reference clock reaches a local time event.

17. The method of claim 16, further comprising:

returning the local reference clock to the first time synchronized with the system timing after sleep.

18. The method of claims 16, wherein stewing the local reference clock comprises setting the local reference clock behind to indicate thereafter a time that is earlier than actual system time.

19. The method of claim 16, wherein stewing the local reference clock comprises setting the local reference clock ahead to indicate thereafter a time that is later than actual system time.

20. The method of claim 16, wherein the local reference clock includes a timing counter that maintains a time count.

21. The method of claim 20, wherein the system time event is a rollover of the time count that would occur in the future if the local system clock remained synchronized to system time, and the local time event is a rollover of the time count of the slewed local reference clock that occurs earlier than the system time event.

22. The method of claim 16, further comprising:

determining a third time corresponding to a desired future time to wakeup from sleep;

computing a sleep duration based on the third time; and exiting sleep when the sleep duration has expired.

23. The method of claim 16, wherein the sleep duration includes the time difference.

24. A timing system for a wireless mobile station that uses periodic timing boundaries to control a low-power mode, the timing system comprising:

a counter that determines a time interval to a next timing boundary upon receiving a command;

a calculating element that calculates a sleep time period based on the time interval; and a signal generator that produces a sleep command signal after the calculating element calculates the sleep time period so that the wireless mobile station enters the low-power mode without waiting the next timing boundary, and produces a wakeup signal when the sleep time period has elapsed.

25. The timing system according to claim 24, wherein the calculating element has a summing element that adds the time interval to a normal sleep time to calculate the sleep time period, wherein the normal sleep time is defined by the timing boundaries.

26. The timing system according to claim 24, wherein the command is issued when user input is ended.

* * * * *